United States Patent [19]
Behr

[11] 3,875,281
[45] *Apr. 1, 1975

[54] MANUFACTURE OF FILM INCLUDING INTEGRAL ZIPPER-LIKE FASTENERS

[75] Inventor: Raymond D. Behr, Midland, Mich.

[73] Assignee: The Dow Chemical Company, Midland, Mich.

[ * ] Notice: The portion of the term of this patent subsequent to Dec. 26, 1972, has been disclaimed.

[22] Filed: Dec. 26, 1972

[21] Appl. No.: 318,108

Related U.S. Application Data

[63] Continuation of Ser. No. 99,782, Dec. 21, 1970, abandoned.

[52] U.S. Cl. .................. 264/95, 264/89, 264/90, 264/177
[51] Int. Cl. ......................................... B29c 17/02
[58] Field of Search .............. 425/72, 326 R, 378; 264/95, 89, 177, 210, 209

[56] References Cited
UNITED STATES PATENTS

| | | |
|---|---|---|
| 3,167,814 | 2/1965 | Corbett ........................ 264/95 |
| 3,385,918 | 5/1968 | Jack et al. ..................... 264/89 |
| 3,564,087 | 2/1971 | Rueckberg ..................... 264/98 |
| 3,577,488 | 5/1971 | Bigland ......................... 264/95 |
| R26,991 | 11/1970 | Luca ............................. 264/95 |

*Primary Examiner*—Robert F. White
*Assistant Examiner*—Gene Auville
*Attorney, Agent, or Firm*—Burke M. Halldorson

[57] ABSTRACT

The present invention resides in the discovery that by controlling the hoop stress in various zones of tubularly extruded film, certain critical dimensions of thickened profiles simultaneously extruded with the film can be controlled in a manner substantially independent of other process variables. Properly formed profiles of this type can be used as interlocking "zipper" type fastener means for plastic bags made from such film.

2 Claims, 5 Drawing Figures

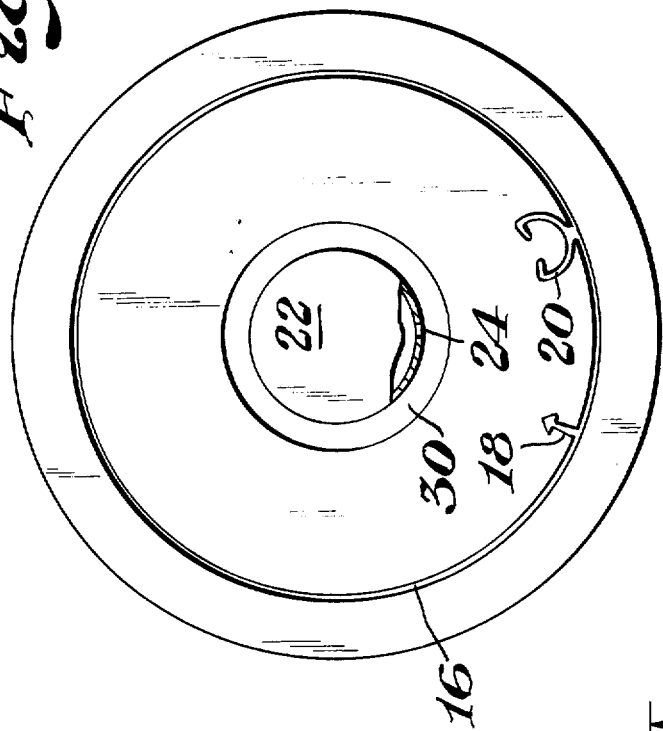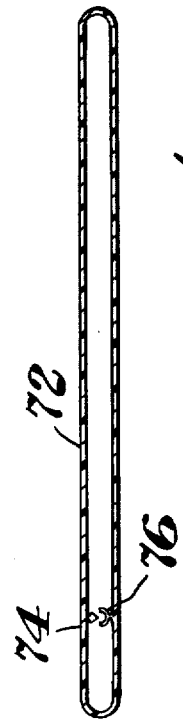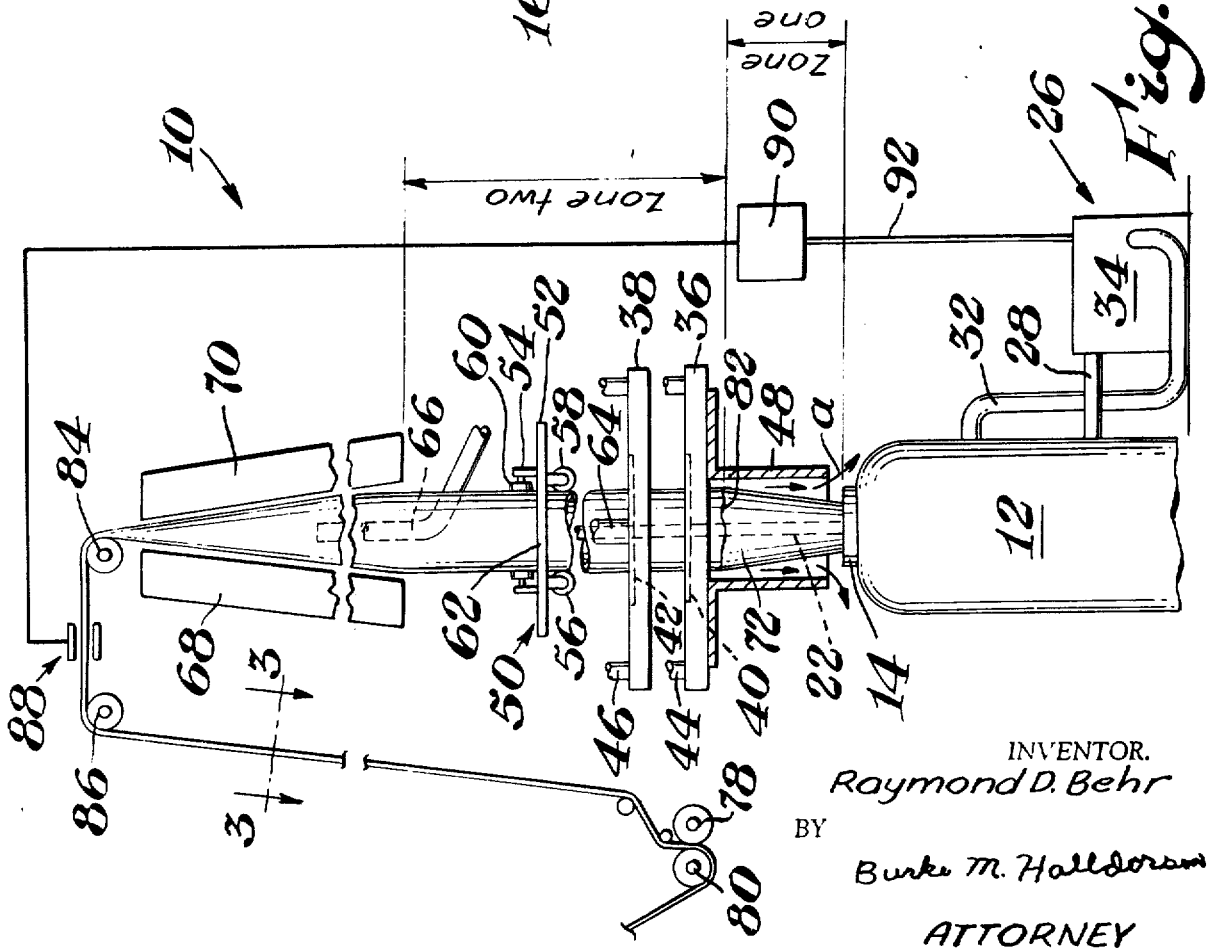

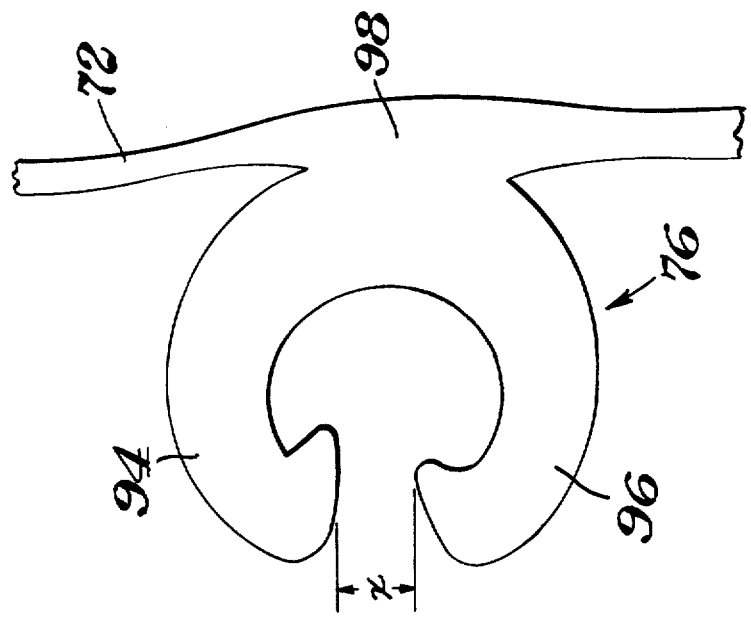
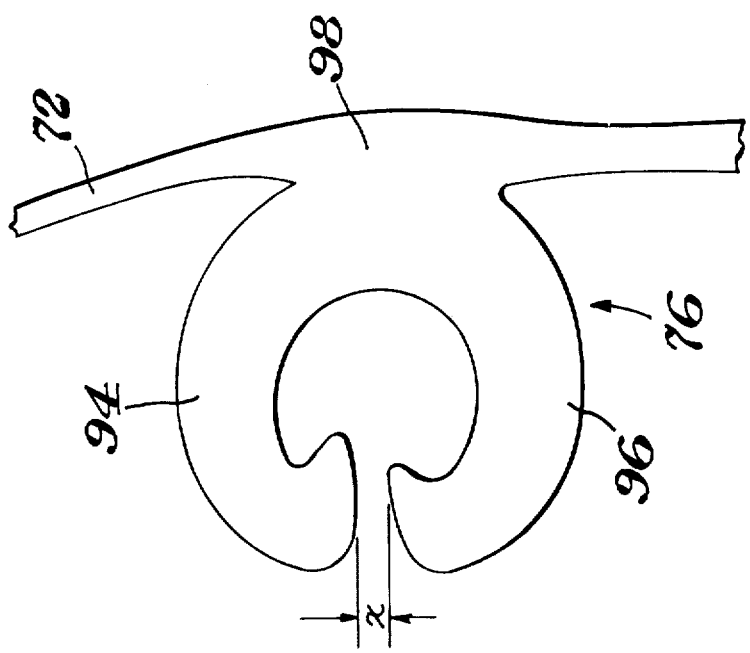

MANUFACTURE OF FILM INCLUDING INTEGRAL ZIPPER-LIKE FASTENERS

Cross-Reference to Related Application

This is a continuation, of application Ser. No. 99,782 Filed Dec. 21, 1970 and now abandoned.

BACKGROUND OF THE INVENTION

The invention generally relates to an improved process for manufacturing plastic tubular film of a type including longitudinally continuous, circumferentially spaced apart thickened strips or profiles. More particularly, the invention relates to a process for controlling the shape and certain critical dimensions of the profiles so that individual pairs of the same tightly interfit or interlock together to provide a repeatedly openable and recloseable "zipper" type fastener.

DISCUSSION OF THE PRIOR ART

Fastener means of the above-indicated variety commonly are manufactured utilizing two basically different approaches. In the first developed process, the technique used is to extrude the fasteners as separate strips which are later attached to various bag or pouch materials. The disadvantages here are mostly in the extra processing steps required to join the fasteners to the bag material.

The better technique for low-cost production is to simultaneously extrude the fasteners as thickened profiles in plastic film material as, for example, as shown in U.S. Pat No. 3,340,116. Ordinarily the extrusion process employs the trapped "bubble" method wherein the film is extruded out an annularly shaped die head adapted to merge the profile or fastener streams with the main stream of plastic forming the tubular film. Air fed internally supports the film and is trapped as a "bubble" such as by collapsing the film at a region remote from the point of extrusion, usually by employing nip rolls or the like.

Difficulties with the indicated bubble process reside in maintaining certain critical dimensions in the fasteners such that, first of all, they properly lock together; and secondly, they receive each other with sufficient tightness to form a substantially air-tight closure or fastener means.

Ordinarily, one of the fasteners, usually called the bead or rib member, is arrow head shaped including an enlarged head portion, and a stem which attaches the head portion to the film. The opposite fastener is commonly referred to as the groove member and basically comprises spaced apart arms attached to the film usually by a somewhat thicker stem, and which together define a gap in which the indicated head portion is received. The outer extremities of the arms normally hook inwardly to firmly lock the head portion within the gap.

The width of the gap, therefore, is crucial and has much to do with the proper functioning of the fasteners. If the gap is too wide, for example, the fasteners separate too easily and therefore are unsatisfactory. On the other hand, if the gap is too narrow, the fasteners are difficult to close in production and later by the end user of the bag. Measurements have shown, for example, that gap width discrepancies in the range of as little as 0.003 inch can separate a properly formed groove fastener member from one that functions unsatisfactorily.

Present manufacturing practices have heretofore relied principally on strategically cooling the film to maintain the desired operating consistency in gap width control. Oftentimes, for example, in addition to surrounding air rings and the like, a local cooling medium such as refrigerated air is applied both to the inside and outside of the bubble in the region of the fastener members. Early practitioners in this art, in fact, oftentimes referred to an "opening" of the gap responsive to amount and point of application of the cooling medium, and therefore, much work was done to define suitable cooling parameters.

Yet other factors that effect the eventual size of the gap are manufacturing speed, and the film blow-up ratio, both having a cumulative reverse effect in that as their values are increased above certain limits, the gap tends to close completely, or close an unsatisfactory amount.

Somewhat more specifically, in the low speed manufacturing of such film, as for example, in the range of 30 feet per minute and less, conditions are occasionally encountered where the gap does not close sufficiently. This problem can usually be solved, however, by knowledgeable adjustments to the film cooling setpup, usually to cool the film more slowly, to bring the gap width down to proper size.

However, as film speeds are increased or attempted to be increased, the problem more often becomes one of preventing the gap from closing completely or closing to an extent that would render the functioning of the zipper fastener difficult or impossible. Air cooling control alone as presently practiced does not provide a satisfactory solution to this problem. In other words, air cooling can presently be used with a certain degree of effectiveness, but usually only if the problem is in part avoided by operating at certain manufacturing speeds and film blow-up ratios. Understandably, however, manufacturing speeds starting at about 100 and up to a desired speed of preferably at least 150 feet per minute are greatly desired to decrease film manufacturing costs. Nevertheless, it is not known that any manufacturer presently commercially operates at speeds much above 40 to 60 feet per minute in producing film of the general type contemplated herein.

Accordingly, it is among the objects of the present invention to provide the following:

A method of manufacturing tubular film including integral fasteners simultaneously extruded therewith in the form of thickened profiles, and wherein improved control of critical dimensions of the profiles is obtained even in high speed film manufacturing.

Such a method wherein the tendency of the gap of the groove member to close to an unsatisfactory degree as film manufacturing speed is increased, is overcome by controlling the hoop stress in strategic zpnes of the moving film as it is being manufactured; and Such a process wherein gap width control is obtained in a manner substantially more independent of other film manufacturing conditions.

SUMMARY OF THE INVENTION

The present invention resides in the discovery that the uniformity and dimension of the gap in the groove fastener member can be dominantly controlled by controlling the degree of transverse stretching of the film in the vicinity immediately adjacent to and underneath the groove fastener member, or in other words, by controlling the hoop stress in strategic zones of the film as it is being manufactured. The inventive process involves various basic control features which can be used separately or together. In one procedure the film is divided into first and second zones, the first zone or zone 1 being essentially that region of the film between the film frost line and the die head. In this region of the film, the atmosphere immediately surrounding the film is reduced below atmospheric pressure, thereby enabling the film bubble to be blown or otherwise stabilized to a selected size at correspondingly lower internal pressures. The effect of reducing the atmospheric pressure immediately surrounding the film in zone 1 can be expediently accomplished by a venturi effect involving moving air streams rapidly along the sides of the film in zone 1. The benefit is realized in the second zone or zone 2 where differential pressure between the inside and outside of the bubble is minimized, thereby effectively reducing hoop stresses in the film in the region of zone 2. This in turn minimizes the transverse stretching of the film in the area immediately underneath the groove and ultimately the amount the gap tends to decrease in width as the film moves through zone 2. Similar results are possible, for example, by internally isolating zones 1 and 2 so that differential pressure and, therefor, hoop stress in zone 2 can be maintained at a minimum while insuring adequate film blow-up pressures in zone 1.

It is believed that the size of the fasteners, such as the thickness of the arms making up the groove member, are set in Zone 1 and are dependent on the amount of thinning of the film as determined largely by film takeaway speed and that gap size is effected by a reduction therein generally proportional to the reduction in size of the fasteners in Zone 1. At regions above the film frost line, or in Zone 2, it is believed that even though the fasteners are still molten or partially molten due to greater thickness than other regions of the film, the same do not continue to thin down any appreciable extent since the fasteners are supported on each side by substantially solidified film, and thereforecannot be stretched or drawn longitudinally. It is further believed that hoop stress in Zone 2 is the dominant cause in moving the arms of the groove fastener to close or substantially close which movement of the arms is eventually "frozen in" as the plastic comprising the fasteners solidifies. In any event, it has been found that by controlling the film hoop stress in Zone 2, the amount the gap tends to close in high speed film manufacture can be significantly reduced substantially independent of other film manufacturing conditions.

BRIEF DESCRIPTION OF THE DRAWINGS

A preferred embodiment of the invention is shown in the accompanying drawings wherein:

FIG. 1 is a schematic and diagrammatic representation of an "air bubble" process of film extrusion including a step to control the hoop stresses in various strategic zones of the film in contemplation of the objectives of the present invention;

FIG. 2 is a top view schematically illustrating a die head employable in the extrusion process of FIG. 1;

FIG. 3 is a cross-sectional view of freshly extruded and collapsed film taken along reference line 3—3 of FIG. 1; and FIG. 4 is a magnified cross-sectional view of a groove fastener member formed at the inside surface of tubularly extruded film in accordance with prior art practices; and FIG. 5 is a view like FIG. 4, but comparatively shows a groove fastener member formed according to the teachings of the present invention.

DESCRIPTION OF THE PREFERRED EMBODIMENT

Referring now more particularly to the drawings, there is shown in FIGS. 1 and 2 film extrusion equipment 10 comprising a conventional extrusion chamber 12, connected to a die head 14 of a type including an annular shaped extrusion orifice 16. The inner die lip defining orifice 16 is cut back to define a rib shaped opening at 18, and a groove shaped opening at 20, each communicating directly with the extrusion orifice. Disposed on the central axis of die head 14 is an internal cooling pipe 22 including a plurality of spaced apart, vertically aligned apertures 24 directed generally toward the region between rib and groove openings 18 and 20. Cooling pipe 22 can be operated by a closed air cooling system denoted schematically at 26, and which connects to pipe 22 through air inlet tubing 28. An annular air outlet aperture 30 is positioned at the base of pipe 22 and functions to recycle air to system 26 via communication with air outlet tubing 32. System 26 desirably comprises an air plenum chamber 34 suitably baffled to recycle warm air received from tubing 32 through internally contains refrigeration means such as a radiator (not shown); and additionally can include internally housed air conveyor means such as an air blower or circulating fan to recycle the cooled air back out outlet tubing 32. Since the system is closed the volume of air within the system is constant except for controlled additions and/or subtractions of air to control film size, as will be explained more fully hereinafter.

Referring now to other parts of apparatus 10, air rings 36 and 38, which can be generally identically structured, are fixedly mounted at spaced distances above die head 14. The air rings ordinarily will include conventional internal design such as baffles, perforated plates and the like (not shown) so that a circumferentially uniform stream of air can be issued out lip portions 40 and 42, respectively, of the air rings. The air rings can be supplied air from a common preferably refrigerated blower system (not shown) communicating therewith such as through a plurality of conduit means 44 and 46 affixed to the top side of each air ring.

Mounted to the underside of lower air ring 36 is a circumferential continuous member or shield 48. Shield 48 cooperatively with lower air ring 36 reduces the air pressure surrounding the film in the area immediately underneath shield 48, as will be explained in more detail later herein.

A film guide device 50 is located a spaced distance above upper air ring 38 and comprises an annular plate 52 horizontally mounted, and defining a centrally positioned aperture or opening 54 of sufficient size to accommodate tubularly extruded film of a certain specified diameter. Aperature 54 is bounded by a three sided guide assembly including spaced apart parallel guide rollers 56 and 58 rotatably affixed to the underside of plate 52; and a third guide roller 60 placed at right angles to roller 56 and 58 and rotatably affixed to the top side of the mounting plate. Rollers 56, 58 and 60 cooperatively define a three sided guide system opening toward a region 62 of plate 52 opposite guide roller 60, region 62 being generally vertically aligned with extrusion openings 18 and 20 of orifice 16.

Spaced apart external cooling means such as pipes 64 and 66 are preferably employed, and can be located a spaced distance above and below film guide device 50 in line with region 62 of plate 52. The lower external pipe 64 is conveniently mounted by affixing the same rigidly to upper air ring 38. Pipes 64 and 66 apply cooling air locally to the extruded film such as through a series of vertically aligned apertures defined therein, respectively; which, in turn, can be supplied air commonly by a blower system indicated as operating air rings 36 and 38, or can be supplied by a separate blower system.

A converging assembly comprising, for example, converging plates 68 and 70 are aligned vertically with guide rollers 56 and 58, respectively, and are located in a region generally coincident with the upper extent of cooling pipe 66. Alternately, converging rollers can be substituted for plates 66 and 68 such as to reduce drag on the extruded film; especially as film manufacturing speeds are increased.

Referring now to the operation of extrusion apparatus 10, plastic material customarily in pellet form, is controllably fed into extrusion chamber 12 where it is heat plastified and delivered under pressure to die head 14. The plastic ultimately emerges out extrusion orifice 16 in the form of a bubble or bubular envelope of film 72, including continuous rib groove fastener members 74 and 76 simultaneously extruded therewith out openings 18 and 20, respectively (see FIG. 2).

The eventual size of the film can be controlled responsive to the amount of air pressure internally supporting the same, and the rate at which the film is drawn away by a pair of film take-away rolls 78 and 80 located usually at a point remote from converging plates 68 and 70. Thus responsive to such film operating conditions, and below the film frost line denoted at 82, the film either grows to a larger diameter, remains at substantially the same diameter as orifice 16, or necks down in size to a smaller diameter. Above frost line 82, the growth of the film is checked by advanced solidification and thus the ultimate size of the film is established at approximately the frost line.

Solidification, of course, begins immediately as the film leaves die head 14 by the cooling effect of the surrounding atmosphere assisted preferably by operating the external cooling rings 36 and 38. Localized cooling of the film in the vicinity of fastener members 74 and 76 is likewise desirably provided through internal cooling pipe 22, and external pipes 64 and 66. Cooperatively, air impinging locally on the film from cooling pipe 66 resiliently urges the film to ride continuously against the three side roller concavity comprising guide rollers 56, 68 and 60, thereby assisting guide roller device 50 in establishing the lateral stability of the bubble.

Thereafter, film 72 is gradually collapsed through sliding contact between converging plates 68 and 70; and adjacent the upper extremity of the plates, the collapsed film is moved horizontally across a pair of spaced apart idler rollers 84 and 86. At this point in manufacture, the lay flat width of the film is continuously measured by a film measuring device 88. Device 88 operates, for example, suitable valving means 90 including air tubing means 92, for automatically adding and/or subtracting air to cooling system 26 responsive to the measured width of the film. If film width is too small, for example, a controlled amount of air is added to system 26 through tubing 92, thereby increasing bubble size due to the increased internal pressure therewithin. Suitable automatic measuring and control eqipment generally of the above noted type can be like that shown in U.S. Pat. No. 3,513,501, or co-pending U.S. Pat application Ser. No 815,157, filed Apr. 10, 1969, the respective desclosures of which are hereby fully incorporated into the present teachings.

Referring now to lower air ring 36, at this region of the film train there is positioned the circumferential continuous shield 48 which ultimately controls the width of the gap in the groove fastener member 76, its width dimension being indicated as X in FIG. 5. The vertical positioning of shield 48 is critical in that it must cover the film in an area below film frost line 82, and most desirably the upper extent of the shield terminates approximately at the frost line. If the shield extends much above frost line 82 its functionality may be impaired somewhat, as will be explained more fully hereinafter. The lowermost end of the shield can terminate closely adjacent die head 14 or at spaced distances therefrom. Shield 48, however, should not be placed so close to die head 14 that air $a$ issuing out lower air ring 36 and moving downwardly between the film and inner surface of the shield is blocked. In other words, the spacing between the shield and the die head should be sufficient to prevent appreciable back-pressures from building at the lower part of the shield adjacent die head 14, with the effect that the back-pressure would substantially impede the rate the air moves downwardly between the film and the inner surface of the shield.

Interestingly enough, it is believed that the effect of shield 48 on the eventual width X of the gap is not realized in the region of the shield, this region comprising Zone 1 and existing approximately between frost line 82 and the die head; but is realized through casual effect in Zone 2, this being the portion of the film above frost line 82. It is believed, for example, that the tendency of gap to close is probably not as severely effected in Zone 1 as might be expected, but is the result of unduly high hoop stress in the film in Zone 2. Of course, the overall thickness of the film and the size of fasteners 74 and 76 is reduced in Zone 1 by viscous flow as the film is stretched longitudinally by the action of take-away rolls 78 and 80 which are normally driven at a greater speed than the extrusion rate of the film. Moreover, if the internal pressure within the bubble is sufficient, the film is additionally stretched circumferentially causing the film to thin or draw-down to an even finer thickness. The overall effect on fasteners 74 and 76 is a reduction in their size as measured by a diminishing of the dimensions of arms 94 and 96, and the stem 98 of groove fastener 76, with similar effect on rib fastener 74, and a proportionate reduction in the width of the gap.

Above the frost line, the film is relatively solidified and therefore longitudinal stretching of the film, if any, would be mostly within the elastic limits of the film and therefore recoverable. Thus even though the plastic comprising the fasteners is still highly molten, the film essentially longitudinally carries the "fasteners" and therefore the size of the fasteners is established at approximately frost line 82. The molten fasteners still respond, however, to circumferentially applied hoop stress in regions above frost line 82. This is believed to gradually cause arms 94 and 96 to move close together in visco-elastic deformation movement, sometimes such that the gap is completely closed.

Referring again to the beneficial effect of shield 48 on the width X of the gap, air moving from the lower air ring 36 as it enters the more constructed region defined by the spacing between the inner surface of the shield and film 72, speeds up accompanied by a drop in the pressure immediately surrounding the film in the area of the film underneath the shield. This does not alter the differential pressure in Zone 1 required to effect a given bubble diameter which remains constant under constant operating conditions, but does permit a corresponding reduction in the internal pressure within the bubble without changing the aforesaid differential pressure.

However, in Zone 2, the differential pressure must decrease precisely by the amount of decrease in internal pressure permitted in Zone 1. A corresponding decrease in film hoop stress in Zone 2 is thus accomplished. In any event the reduction of hoop stress in Zone 2 has been found to minimize the tendency of the gap to close and thus provides a consistent and effective means of controlling width X substantially independent of normal small variances in film manufacturing conditions. As may be appreciated, the functionality of shield 48, cooperative with measuring device 88, automatically effects equilibrium conditions in which film 72 of certain size is being manufactured utilizing lower film blow-up or internal pressures, thereby resulting in lower hoop stresses in Zone 2, said internal pressure within the film being automatically controlled responsive to the lay-flat width whereof as continuously measured by device 88.

EXAMPLE I

Film 72 is manufactured at a rate of 80 feet per minute using the apparatus of FIG. 1 except for the deletion of shield 48. The plastic comprises a low density polyethylene formulation which is extruded at a melt temperature of approximately 330°F. Room temperature is 72°F. Air rings 36 and 38 are set at 14 and 28 inches, respectively, above die head 14. The air rings and external pipe 64 and 66 are operated with cooling air at a temperature of approximately 34°F. Internal cooling pipe 22 is operated with cooling air at a temperature of approximately 51°F. The film blow-up ratio is about 1.08, and the stabilized diameter of the bubble approximately 5¾ inches. The pressure inside the film is 0.165 inches of water relative to atmospheric pressure. The width X of the gap of the resultant groove member 96 is about 4178 mils, and is shown as magnified 50 times in FIG. 4. The fastener does not function satisfactory as the width dimension X of member 96 is too small.

EXAMPLE II

The process of Example I is repeated under substantially identical operating conditions except this time a shield 48 is employed. The shield 48 is approximately 8 inches in diameter and 5 inches in length; and is attached to the underside of air ring 36 as is shown in FIG. 1. The pressure inside the film is 0.150 inches of water relative to atmospheric pressure. The width X of the gap of the resultant groove member 96 is a satisfactory 0.01 inch, and is shown as magnified 50 times in FIG. 5.

While the invention has been particularly described in terms of employing a venturi effect to implement the principles thereof, other devices are so applicable to accomplish a similar end. For example, Zone 1 can be isolated in a surrounding chamber from which air is evacuated or partially evacuated to reduce the air pressure surrounding the film in Zone 1, and thereby accomplish reduced hoop stress in the film in Zone 2. Yet other devices are applicable such as by using a horizontal plate to internally isolate Zones 1 and 2 and thereby effect a lower internal pressure in Zone 2 relative to the internal pressure of "blow-up" pressure in Zone 1. For example, if such a plate is used, the cooling air from internal pipe 22 could be emitted in Zone 1, but withdrawn or recycled from Zone 2 to reduce internal pressure in the vicinity of Zone 2.

Accordingly, while certain representative embodiments and details have been shown for the purpose of illustrating the invention, it will be apparent to those skilled in the art that various change and modifications can be made therein without departing from the spirit and scope of the invention.

What is claimed is:

1. In a method of manufacturing film; the steps comprising: extruding a tube of a heat plastified, film forming synthetic resinous material, simultaneously extruding a first thickened profile of a general type defining a continuous gap the width of which is sensitive to hoop tension in the tube during its manfacture, and at least a second thickened profile spaced circumferentially from the gap defining profile and adapted to be interlockingly receivable in said gap by means of cooperative sizing and configuration between the profiles, said profiles extending continuously in the direction of extrusion along the inner surface of the tube, cooling and forming the tube about a trapped gas bubble and thereafter collapsing the tube, the improvement of which comprises, the step of reducing the inherent hoop tension imparted to the gap defining profile by the trapped gas bubble, said step of reducing hoop tension being practiced selectively over a sufficient portion of the region defined between the frost line of the film and that of the profiles as is necessary to properly size said gap respective to the size of the profile receivable therein, to thereby produce from said profiles a mechanically locking and unlocking fastener.

2. The method of claim 1 wherein said film is being manufactured at a rate of at least 80 feet per minute.

* * * * *